United States Patent [19]

McKay

[11] 4,264,433

[45] Apr. 28, 1981

[54] PASSIVATING METALS ON CRACKING CATALYSTS BY INDIUM ANTIMONIDE

[75] Inventor: Dwight L. McKay, Bartlesville, Okla.

[73] Assignee: Phillips Petroleum Company, Bartlesville, Okla.

[21] Appl. No.: 102,495

[22] Filed: Dec. 11, 1979

Related U.S. Application Data

[62] Division of Ser. No. 949,289, Oct. 6, 1978, Pat. No. 4,208,302.

[51] Int. Cl.$^3$ .............................................. C10G 47/20
[52] U.S. Cl. ................................ 208/113; 208/52 CT; 208/120; 252/411 R; 252/455 Z

[58] Field of Search ................................. 208/113, 120

[56] References Cited

U.S. PATENT DOCUMENTS

| | | | |
|---|---|---|---|
| 2,901,419 | 8/1959 | Brill | 252/411 R |
| 3,711,422 | 1/1973 | Johnson et al. | 252/414 |

*Primary Examiner*—Herbert Levine
*Assistant Examiner*—G. E. Schmitkons

[57] ABSTRACT

Contaminating metals on a clay based cracking catalyst are passivated by contacting the catalyst with indium antimonide under elevated temperature conditions.

4 Claims, No Drawings

PASSIVATING METALS ON CRACKING CATALYSTS BY INDIUM ANTIMONIDE

This is a divisional application of application Ser. No. 949,289, filed Oct. 6, 1978, now U.S. Pat. 4,208,302 issued June. 17, 1980.

The present invention relates to the art of catalytic cracking of hydrocarbons. In one aspect the invention relates to modified cracking catalyst. More specifically the invention relates to the restoration of the activity of used cracking catalysts. Particularly, the invention relates to the passivation of contaminating metals on cracking catalysts.

BACKGROUND OF THE INVENTION

Hydrocarbon feedstock containing higher molecular weight hydrocarbons is cracked by contacting the feedstock under elevated temperature conditions with a cracking catalyst whereby light distillates are produced. However, the cracking catalyst gradually deteriorates during this process. One source for this deterioration is the deposition of contaminating metals, such as nickel, vanadium and iron on the catalyst, which increase the production of hydrogen and coke. At the same time the conversion of those higher molecular weight hydrocarbons into gasoline is reduced.

THE INVENTION

It is thus one object of this invention to provide a regenerated catalytic cracking process.

A further object of this invention is to provide a modified cracking catalyst.

Another object of this invention is to provide a process for the restoration of used cracking catalysts.

A still further object of his invention is to provide a process for the passivation of contaminating metals deposited on a cracking catalyst.

Yet another object of this invention is to provide a process for passivating contaminating metals on a cracking catalyst by which the composition of the product obtained by a cracking process using this catalyst can be controlled.

A still further object of this invention is to provide a process for the passivation of contaminating metals on a cracking catalyst by which the butadiene content in the effluent of a catalytic cracker can be controlled.

Further objects, embodiments, advantages and features of this invention will become apparent to those skilled in the art from the following description and the appended claims.

In accordance with this invention, I have now found that contaminating metals deposited on a cracking catalyst and partially deactivating this cracking catalyst for the production of gasoline can be passivated by contacting the cracking catalyst with indium antimonide.

Contacting of the catalyst contaminated with the metals mentioned is achieved in various manners. The indium antimonide (InSb) is generally employed in a finely divided form. The used cracking catalyst is contacted with indium antimonide in this finely divided form either in a batch process or more desirably in a continuous process. In a cracking unit that circulates the cracking catalyst continuously from the cracking reactor to a regenerator, the indium antimonide can be added either to the used cracking catalyst withdrawn from the cracking reactor and being introduced into the regenerator or to the regenerated used catalyst that is withdrawn from the regenerator and reintroduced into the cracking reactor. The indium antimonide can be admixed with the catalyst at any point of the circulating catalyst. It is also within the scope of this invention to add the indium antimonide to the hydrocarbon feedstock before it contacts the cracking catalyst.

The contacting of the cracking catalyst with the indium antimonide can be achieved by various mixing means known in the art, such as shaking, rolling, tumbling, etc., of a container containing the cracking catalyst and the indium antimonide in finely divided form. In the case where the indium antimonide is added to the catalyst flowing between the reactor and the regenerator, no separate mixing step is necessary as the flow of materials produces a sufficient mixing between the solid cracking catalyst and the solid indium antimonide.

The indium antimonide is preferably employed in finely divided powder form so that the compound passes through a Tyler Standard Screen of about 100, more preferably 150 mesh. It is within the scope of this invention to employ the indium antimonide in even finer divided form, e.g., as a pwder that passes through a Tyler Standard Screen of 400 mesh. The particle size of the indium antimonide powder employed will be generally such that the particles have a diameter from about 0.15 mm to 0.02 mm. Finer powders can also be used.

The catalyst and indium antimonide are subjected to high temperature conditions to effect reaction of the additive compound with the contaminating metals. This temperature is generally in the range of about 800 to about 1500° F. (about 420° to about 820° C.). This high temperature treatment can be achieved within the regenerator or by a separate heating step.

The quantity of indium antimonide with respect to cracking catalyst can be varied in broad ranges. Generally, the quantity of indium antimonide used will be increased with increasing deposit of the contaminating metals, such as nickel, vanadium and iron. Usually about 0.005 to about 5 parts by weight, preferably 0.02 to 2 weight percent, of indium antimonide are employed per hundred parts by weight of the cracking catalyst. The total quantity of added indium antimonide can be added to the cracking catalyst over an extended period of time. The rate of indium antimonide addition and the time during which the compound is added then are adjusted such as to result in an overall concentration of indium antimonide within the range given above.

In accordance with one embodiment of this invention, if has been found that the fluid which is in contact with the mixture of the metals-contaminated cracking catalyst and indium antimonide for the initial heat treatment strongly influences by-product composition of the effluent produced by the thus treated cracking catalyst. In particular it has been found that whereas the gasoline yield in the cracking process using a metals-contaminated cracking catalyst, the contaminating metals of which have been passivated by indium antimonide, is improved if the contacting of the cracking catalyst with indium antimonide and the heat treatment of this mixture was achieved in oxidizing or reducing atmosphere, the by-product composition was significantly different. More particularly, I have found that in a process for catalytically cracking crude oil, a cracking catalyst mixed with indium antimonide when initially heat treated under reducing conditions, particularly in the presence of hydrogen, produces a larger amount of butadiene, as compared to the catalyst contacted with the same indium antimonide when initially heat treated in an oxidizing atmosphere, particularly in the presence of free oxygen. Hence, if it is desired to make more by-product butadiene in the cracking operation, the initial high temperature treatment of the mixture of the cracking catalyst and the indium antimonide is carried out in a reducing atmosphere. It has also been found that this "selectivity" in the by-products achieved by the initial heat treatment either in an oxidizing atmosphere or in a reducing atmosphere, is unaffected by the further regeneration of the catalyst in air. Thus the cracking catalyst regeneration following, e.g., the initial heating step of the mixture of cracking catalyst and indium antimonide in a hydrogen containing atmosphere, can be carried out in air in a conventional regenerator and the catalyst still maintains the property of producing an increased amount of butadiene by-product as compared to the catalyst/indium antimonide mixture treated in an oxidizing atmosphere.

The conditions of the initial heat treatment of the cracking catalyst/indium antimonide mixture generally are within the following ranges when the treatment occurs at atmospheric pressure as normally practiced:
Temperature: about 800° to about 1500° F. (about 420° to about 820° C.).
Pressure:
  Partial oxygen pressure: about 75 to 300 mm Hg (10.0 to 40 kPa) or
  Partial hydrogen pressure: about 50 to 760 mm Hg (6.6 to 101.1 kPa)
Duration of high temperature treatment: about 1 minute to about 5 hours.

During the high temperature treatment of the cracking catalyst/indium antimonide mixture, the desired gas can be passed through the mixture continuously to effect passivation in the time limits expressed above. In case the initial heat treatment of the catalyst/indium antimonide mixture is carried out in a catalyst regenerator, the passivation of the contaminating metals by the indium antimonide occurs simultaneously with the buring off of coke from the catalyst. In this embodiment the duration of the treatment is merely defined by the regeneration process, the passivation of contaminating metals occurring simultaneously.

In accordance with a further embodiment of this invention, there is provided an improved cracking process. In this cracking process a hydrocarbon feedstock is contacted with a cracking catalyst in a cracking zone under cracking conditions, the cracked feedstock is removed from the cracking zone for further processing, the cracking catalyst is obtained by contacting it with indium antimonide and subjecting it to elevated temperature conditions; the indium antimonide passivates contaminating metals deposited on the cracking catalyst. Preferably and in accordance with a further embodiment of this invention, the cracking catalyst is continuously circulated from a cracking zone to a regeneration zone and back. In the regeneration zone the cracking catalyst is contacted with a free oxygen containing gas such as air to burn off the coke from the cracking catalyst. The cracking catalyst is contacted with the indium antimonide by adding the indium antimonide to the hydrocarbon feedstock flowing to the cracking zone. The preferred treatment conditions, particle sizes, etc., given above in connection with the passivating step alone also apply in this cracking process.

The cracking catalysts modified by the passivating treatment of this invention are synthetic or natural silica-almina compositions containing from 0 to about 10 wt. % of other metal oxides. The cracking catalysts that can be treated in accordance with this invention are commercially available. The amounts of nickel and vanadium in the unused catalyst should be very small, i.e., less than about 0.05 wt. % and the iron content should be less than about 0.5 wt. % to prevent excessive coke and hydrogen formation in the cracking process. The alumina content can vary from about 10-60 wt. % and the silica content can vary from about 80-30 wt. % in general. In addition, the catalyst can contain rare earth metals, such as cerium and lanthanum, magnesia, zirconia, boria or thoria.

It is presently preferred to use active clay catalysts, however. The catalysts are produced from such clays as bentonites, halloysites and kaolinites. Treatment such as acid washing followed by water washing can be employed to improve catalytic activity of the clay. After such treatment, the clay can be pelletized and calcined to produce the final poduct.

The catalysts are often associated with zeolitic materials and these materials can be ion exchanged to provide metal ions which influence the activity of the catalyst. Rare earth metals such as lanthanum, cerium, praseodymium, neodymium and the like and combinations thereof can be used for this purpose.

The feedstocks employed for the cracking process of this invention also are the standard feedstocks used in catalytic cracking. Examples for such feedstocks are petroleum, shale oil, gas oil, topped crude oil, fuel oils and the like. Generally the feedstocks are those that have boiling points above the boiling point range of gasoline, in other words that have boiling point ranges above about 400° F. (about 200° C.).

In accordance with a still further embodiment of this invention, there is provided a modified cracking catalyst. The cracking catalyst in accordance with this embodiment of this invention is characterized by comprising a modifying amount, i.e., a quantity of about 0.005 to about 5 parts by weight indium antimonide per 100 parts by weight of unmodified cracking catalyst. This modified cracking catalyst has the advantage of increased gasoline yield as compared to an unmodified catalyst and correspondingly reduced production of coke and hydrogen as compared to the cracking catalyst containing no indium antimonide.

The unmodified cracking catalyst is essentially an alumina-silica based cracking catalyst which can contain activating elements such as lanthanum or cerium. This cracking catalyst is described in more detail above.

The modified catalyst of this invention is obtained by mixing the unmodified cracking catalyst with a sufficient quantity of indium antimonide in powder form to deposite the desired weight percentage thereof on the cracking catalyst, and subsequent heating of the mixture to an elevated temperature, preferably in the range of about 800 to about 1500° F. (about 420° to about 820° C.). This heating step is preferably carried out wile the unmodified catalyst/indium antimonide mixture is kept in fluidized state by a fluidizing gas.

In accordance with a further embodiment of this invention, the modified catalyst is obtained by carrying out the heating step just mentioned in the presence of a reducing fluidizing surroundings. It has been found that the reducing surroundings in this procedure result in a modified cracking catalyst producing a higher concentration of butadiene in the by-products of the cracking process, while leaving the high level of gasoline yield essentially unchanged.

The preferred parameters for the particle size of the indium antimonide, as well as the preferred conditions under which the modified catalyst of this invention is produced, are the same as those disclosed above in connection with the passivating process.

The indium antimonide used in accordance with this invention is a commercially available product. It can be produced by direct combination of stoichiometric amounts of the elements by heating them in an inert atmosphere to above about 580° C., the melting point of the compound.

The invention will be still more fully undertstood from the following examples that are intended to illustrate preferred embodiments of this invention but not to limit the scope thereof.

EXAMPLE I

Fresh active clay catalyst consisting essentially of finely divided clay having deposited thereon rare earth metals, commercially available under the trademark F-1000 by Filtrol Corporation, had been used in a commercial operation for cracking topped crude oil. The used catalyst on which contaminating metals had been deposited was sampled. The content of contaminants on the cracking catslyst before and after the commercial cracking process are shown in the following table together with some catalyst properties:

TABLE I

| Properties of New and Used Cracking Catalyst | | |
|---|---|---|
| Property | New | Used |
| Surface area, m²/g | 200 | 74.3 |
| Pore volume, ml/g | 0.4 | 0.3 |
| Weight percent | | |
| $Al_2O_3$ | 40.0 | 39.27 |
| $SiO_2$ | 57.1 | 56.06 |
| Nickel | 0.01 | 0.38 |
| Vanadium | 0.03 | 0.62 |
| Iron | 0.36 | 0.94 |
| Sodium | 0.27 | 0.41 |
| Potassium | 0.25 | 0.27 |
| Calcium | 0.16 | 0.28 |
| Lithium | <0.01 | <0.01 |
| Antimony | <0.015 | <0.015 |
| Cerium | 0.40 | 0.39 |
| Lanthanum | 1.4 | 1.37 |

This used catalyst was first dried at 900° F. in a fluidized bed with air. Thereafter three samples 1, 2 and 3 of the catalyst were taken and treated as follows. Sample 1 was not blended with any additional material and was used as the control sample. Samples 2 and 3 were both blended with a sufficient quantity of indium antimonide powder which passed through a 325 mesh screen to add 1.56 weight percent of indium antimonide to the catalyst. The particles of the indium antimonide powder had a diameter of about 0.043 mm or less. The thus prepared samples 1, 2 and 3 were charged to a laboratory size confined fluid bed reactor. After a nitrogen purge, the three samples were heated to 1200° F. (650° C.) and maintained there for 5 minutes in the presence of a fluidizing gas, which in the case of sample 1 was air, for sample 2 was hydrogen, and for sample 3 was air. Sample 2 thereafter was purged with nitrogen and then all three samples were heated in the presence of air for 15 minutes at 1200° F. (650° C.). The samples were then again purged with nitrogen and cooled to 950° F. (510° C.). Then one aging cycle was carried out with each sample 1, 2 and 3 by using the samples to process Borger topped crude oil feed for 30 seconds at 950° F. (510° C.). Following this aging cycle, each catalyst after nitrogen purge was regenerated by contacting it with fluidizing air at 1200° F. (650° C.) for 30 minutes. Thereafter the samples were purged with nitrogen to adjust the temperature to 1050° F. (566° C.). The thus regenerated catalyst was then used to process Borger topped crude oil feed for 30 seconds at 1050° F. (566° C.). The effluent from each reactor was analyzed and evaluated. The feedstock used had an API gravity rating at 60 ° F. (16° C.) of 20.9, a pour point of 70° F. (21° C.) and a viscosity of 142 SUS at 210° F. (99° C.), which is equivalent to a Kinematic viscosity of 51.9 mm²/sec (cSt) at 99° C.

The results obtained in the second cracking cycle are shown in the following table:

TABLE II

| Influence of Activating Conditions on Performance of Catalyst | | | |
|---|---|---|---|
| | Sample No. | | |
| | 1 Control | 2 Invention | 3 Invention |
| Activating medium | air | hydrogen | air |
| Treating agent | none | InSb | InSb |
| Catalyst/oil, wt. ratio | 5.05 | 5.04 | 5.02 |
| Conversion, vol. % of feed | 73.3 | 74.5 | 74.8 |
| Yields | | | |
| Gasoline, vol. % of feed | 48.8 | 56.7 | 55.8 |
| Coke, wt. % of feed | 13.3 | 11.0 | 10.8 |
| Hydrogen, SCF/bbl converted | 745 | 475 | 474 |
| By-products, wt. % of feed | | | |
| $C_1$ | 1.25 | 1.64 | 1.17 |
| $C_2$ | 1.99 | 2.64 | 1.50 |
| $C_3$ | 0.98 | 1.06 | 0.74 |
| $C_3$ (propylene) | 4.48 | 5.00 | 3.57 |
| i-$C_4$ | 2.27 | 2.26 | 2.48 |
| n-$C_4$ | 0.60 | 0.59 | 0.69 |
| $C_4$ (olefins) | 5.63 | 6.32 | 5.49 |
| Butadiene in $C_4$ olefin cut, wt. % | 1.04 | 2.60 | 1.35 |
| Total by-products, wt. % of feed | 17.2 | 19.5 | 15.6 |
| $C_4$ olefins to total by-products ratio | 0.33 | 0.32 | 0.35 |

It was observed that the upper wall of the reactor had a fine yellow dust deposit on it after the air activation treatment given catalyst sample 3. The yellow dust was also present after the air regeneration following the cracking cycle. No yellow dust was observed in the reactor with catalyst sample 2 activated in a hydrogen ambient, and no yellow dust was noted in the reactor following air regeneration given the treated catalyst after a cracking cycle.

The results of the above table show several features. Primarily the yields expressed in the volume percentage of gasoline produced are significantly increased by treatment of the used clay catalyst in accordance with this invention. Correspondingly, the coke production and the hydrogen production are significantly reduced by the deposition of the indium anitmonide on the clay catalyst. In addition, however, the above-shown table indicates that the concentration of butadiene in the by-products is significantly increased if the mixture of used clay catalyst and indium antimonide is heat treated first in contact with hydrogen as compared to an initial heat treatment in an oxygen-containing surroundings. The catalyst sample 2 produced about 98% more butadiene in the $C_4$ olefin cut than the portion 1 catalyst. The portion 3 catalyst only produced about 30% more butadiene than the portion 1 control catalyst. This result can be used in order to control the by-product composition, particularly the butadiene concentration in the effluent of a catalytic cracker by adjusting the atmosphere in which the cracking catalyst/indium antimonide mixture is first heat treated from an oxidative atmosphere with relatively low butadiene production to a reductive atmosphere with relatively high butadiene production.

EXAMPLE II

This calculated example is given to show the operation of the invention in a plant scale catalytic cracking operation. In a cracking unit containing 200 tons of active clay catalyst (F-1000), 24,300 bbl/day of oil having an API gravity of 20.8 are cracked. In order to build up a level of about 0.5 wt. % of indium antimonide on the cracking catalyst, indium antimonide is added in a quantity of 20 ppm in finely divided particle form to the feedstock for 17 days or in a quantity of 30 ppm of indium antimonide to the feedstock for 10 days. By adding the indium antimonide to the feedstock in finely divided powder form, the mixture of feedstock, catalyst and indium antimonide is exposed to a reducing atmosphere in the cracking unit. Therefore, by this procedure an increased production of butadiene is to be expected as compared with a procedure in which the indium antimonide is added to the used cracking catalyst shortly before it enters the regenerator in which it is exposed to an oxidative atmosphere at elevated temperatures.

In order to keep the indium antimonide level at 0.5 wt. %, the rate of addition has to be 11 ppm of indium antimonide in case 8 tons of catalyst per day are withdrawn from the cracking reactor and replaced by unmodified catalyst. In absolute figures, this means that in this case 165 pounds of indium antimonide per day has to be added to the system to maintain the desired level of indium antimonide on the catalyst.

Reasonable variations and modifications which will become apparent to those skilled in the art can be made in this invention without departing from the spirit and scope thereof.

I claim:

1. In a process for catalytic cracking of a hydrocarbon feestock, comprising
    contacting said hydrocarbon feedstock in a cracking zone with a clay based cracking catalyst under cracking conditions, and
    withdrawing the cracked hydrocarbon feedstock from said cracking zone for further processing,
    the improvement which comprises contacting the cracking catalyst with indium antimonide under sufficiently high temperatures to passivate contaminating nickel, vanadium and iron on said catalyst.

2. A process in accordance with claim 1 wherein said cracking catalyst is contacted with indium antimonide in a quantity sufficient to deposit thereon about 0.005 to about 5 wt. % indium antimonide based on the original cracking catalyst plus indium antimonide.

3. A process in accordance with claim 1 comprising
    a. regenerating said cracking catalyst by continuously withdrawing the cracking catalyst from the cracking zone and introducing it into a regeneration zone,
    b. contacting the cracking catalyst in said regeneration zone with a free oxygen containing gas such as to burn off coke deposited on said cracking catalyst, and
    c. removing regenerated cracking catalyst from said regeneration zone and reintroducing this cracking catalyst into the cracking zone.

4. A process in accordance with claim 1 comprising adding the indium antimonide to the hydrocarbon feedstock.

* * * * *